United States Patent
Furstenberger et al.

[15] 3,670,945
[45] June 20, 1972

[54] MOBILE ASSEMBLY FOR THE INSTALLATION OF CONDUITS BY WELDING SUCCESSIVE TUBULAR ELEMENTS

[72] Inventors: Jean Furstenberger, Bois D'Arcy; Guy Lebrun, Vignieres-Annecy Le Vieux; Denis Girault, Annecy, all of France

[73] Assignee: Societe Alsacienne de Constructions Atomiques de Telecommunications et d'Electronique (Alcatel), Paris, France

[22] Filed: June 3, 1970

[21] Appl. No.: 43,152

[30] Foreign Application Priority Data

June 6, 1969 France....................................6918854

[52] U.S. Cl..................................228/4, 228/49, 285/286, 228/45
[51] Int. Cl..........................................................B23k 1/00
[58] Field of Search....................228/4, 5, 19, 15, 44, 45, 49; 219/60 R, 60 A, 61; 285/286

[56] References Cited

UNITED STATES PATENTS

| 2,463,907 | 3/1949 | Risley et al. | 228/19 X |
| 2,960,597 | 11/1960 | Bruno et al. | 219/60 A X |
| 3,085,146 | 4/1963 | Ferreruela | 219/60 R |
| 3,182,171 | 5/1965 | Persson | 228/49 X |
| 3,427,428 | 2/1969 | Nelson et al. | 219/60 R |
| 3,461,540 | 8/1969 | Rieppel et al. | 29/493 |

Primary Examiner—John F. Campbell
Assistant Examiner—R. J. Craig
Attorney—Sughrue, Rothwell, Mion, Zinn & Macpeak

[57] ABSTRACT

One or two vehicles have automatic driving units for lining up the spindles of the operating units joined to hollow shafts inserted in the units which are to be welded. Each shaft bears, at its free end, a mandrel to be friction fitted simultaneously in the unit to be welded and in the previously welded unit to ensure that the ends of the two tubes coincide precisely while they are being welded.

7 Claims, 11 Drawing Figures

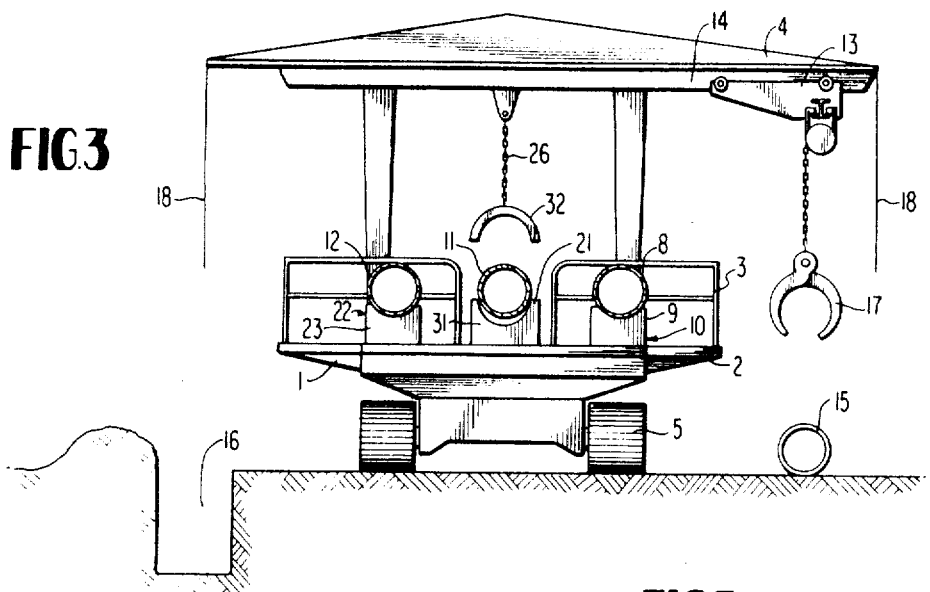
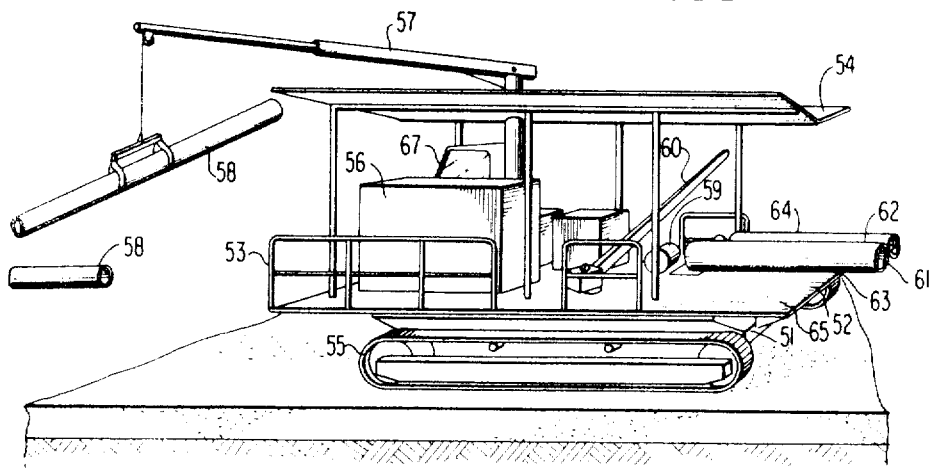
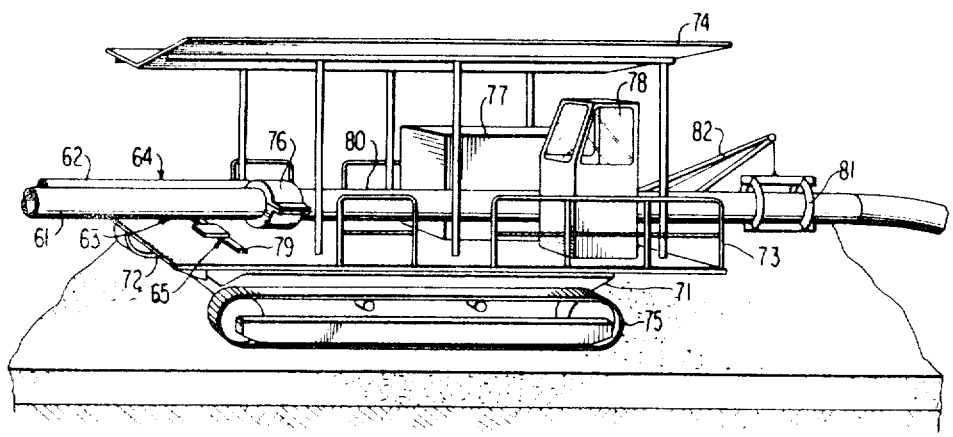

MOBILE ASSEMBLY FOR THE INSTALLATION OF CONDUITS BY WELDING SUCCESSIVE TUBULAR ELEMENTS

BACKGROUND OF THE INVENTION

1. Field of the Invention

The present invention relates to a movable assembly for the installation of conduits by welding successive tubular elements.

2. Description of the Prior Art

The construction of water, gas and petroleum conduits or piping systems, such as oil and gas pipelines and others, which carry fluids between two or more points which are sometimes very far apart, is generally achieved by suitable tubular elements being welded end to end, the pipeline then being buried at a certain depth in the ground. Such operations consequently necessitate the positioning of gantries comprising various stations, on the one hand, stations for preparing the tubular elements for welding and directed particularly to removing from the ends thereof any defects and also any dirt and, on the other hand, a welding station where excellent connections of the elements to one another by welding have to be very carefully produced. It is readily appreciated that such gantries have to be continuously moved as the construction of the conduit progresses, so that the operations of welding and associated operations can be assured at given locations which generally are at regular intervals.

However, such an arrangement has a certain number of disadvantages.

In particular, the various operations which are concerned with welding the elements to one another and especially the operations comprising preparation and the welding proper, are effected following one another. The appreciable loss of time resulting therefrom causes relatively long constructional delays, which are balanced by a very high operational cost.

Furthermore, the various stations for carrying out the aforementioned operations are sometimes spaced fairly far apart, and this results in supplementary manipulations, which can sometimes even lead to serious difficulties, especially in regions where the state of the terrain is not firm or there is a very varying relief.

In addition, such gantries are found to be particularly vulnerable to climate and bad weather conditions. The result is that sometimes it becomes necessary immediately to stop operations, and this again contributes to increasing the time for construction and entailing further increase in the final operational cost.

SUMMARY OF THE INVENTION

The present invention overcomes all these disadvantages by providing a movable and practical installation to ensure quickly and without any interruption the simultaneous carrying out of various operations connected with the establishment of conduits by successive tubular elements being welded together.

The invention is thus concerned with a movable installation comprising at least one self-propelled vehicle comprising a platform, on which are arranged, cradles aligned along at least two parallel working axes and designed to receive tubular elements which have to be successively welded end to end. Each element is capable of being positioned by means of lifting gears, rolling first on the cradles of one of the axes in order to be subjected thereon to the preparatory work for the welding, while another element, already prepared, is in course of being welded to the end of the conduit already established and aligned on the second axis. The prepared new element is brought, following the completion of the welding of the preceding element and advance of the vehicle for the length of an element, on to the said second axis in order in its turn to be welded to the end of the preceding element. The invention is characterized in that the platform of the vehicle or vehicles has installed thereon automatic driving means aligned on the axes of the conduit elements and to which can be connected shafts capable of being introduced into the said elements to be welded and each carrying at its free end a mandrel adapted to be fitted simultaneously into the element to be welded and into the end of the conduit already formed, while exerting on them the necessary mechanical forces by means of any suitable means, capable of ensuring the precise coincidence of the two ends of the tubes during the welding, which is effected by means of a welding arrangement carried by the said mandrel, the welding thus being effected inside the tube.

At the welding station, two shells can form a casing around the ends of the two tubular elements which are to be connected, the lower shell of the casing being fixed on the platform of the vehicle, while the upper shell is removable and can be maneuvered by means of a lifting gear. The two shells are able, by any suitable means permitting them to exert a mechanical pressure distributed all around the ends of the tubes to be welded, to replace the aforesaid internal mandrel or to add to its effect. Another welding arrangement is moreover adapted to be also integrated with the shells to operate alone or in association with that which is carried by the internal mandrel.

The installation can comprise two working axes, one axis for the preparation of the tubular element to be welded and a welding axis or, the installation can comprise three working axes: a welding axis and two preparatory axes situated on either side of the said welding axis.

In a first embodiment of the installation, the self-propelled unit is formed by a single vehicle, on which are assembled all the stations and the preparatory and welding devices.

In a second embodiment, the self-propelled unit is formed by two independent vehicles, namely, a front vehicle, and a rear vehicle, the driving members of the shafts being positioned on the front vehicle and the welding station and the preparatory station being placed on the rear vehicle.

An installation in accordance with the invention has several advantages as compared with the usual technique.

In particular, the welding operation as such and also the associated operations such as loading and handling of the tubular elements, are effected simultaneously. The result is a very high speed of construction of the conduit, and this results in a particularly moderate cost of construction.

Furthermore, the compact disposition of the various stations and members on one or two vehicles on any suitable ground makes it possible to avoid any handling difficulties resulting from the nature of the ground or its relief, and this in turn contributes to increasing the speed of construction and also in the reduction of the cost.

Furthermore, the precise positioning, in an entirely automatic manner, of the mandrel and the welding unit opposite the welded joint to be formed can be carried out by an ordinary workman without any special qualification, and this again leads to considerable economies in the cost of construction.

In addition, the compact grouping of the various stations and members permits them to be effectively protected against bad weather conditions. Such a movable station is consequently capable of being operated without interruption, both at night and during the day and in all weathers, which results in a high speed of construction while ensuring an excellent quality of the welded joints produced in this way.

Other features and advantages of the invention will be apparent from the following description, given simply as a non-limiting example, and by reference to the accompanying drawings.

BRIEF DESCRIPTION OF THE DRAWINGS

FIG. 3 is a section on the line III—III of FIG. 4b;

FIG. 5 is a perspective view of the front vehicle of the movable unit in accordance with a second embodiment of the invention;

FIG. 6 is a perspective view of the rear vehicle of the said unit;

DESCRIPTION OF THE PREFERRED EMBODIMENT

Figure 1:
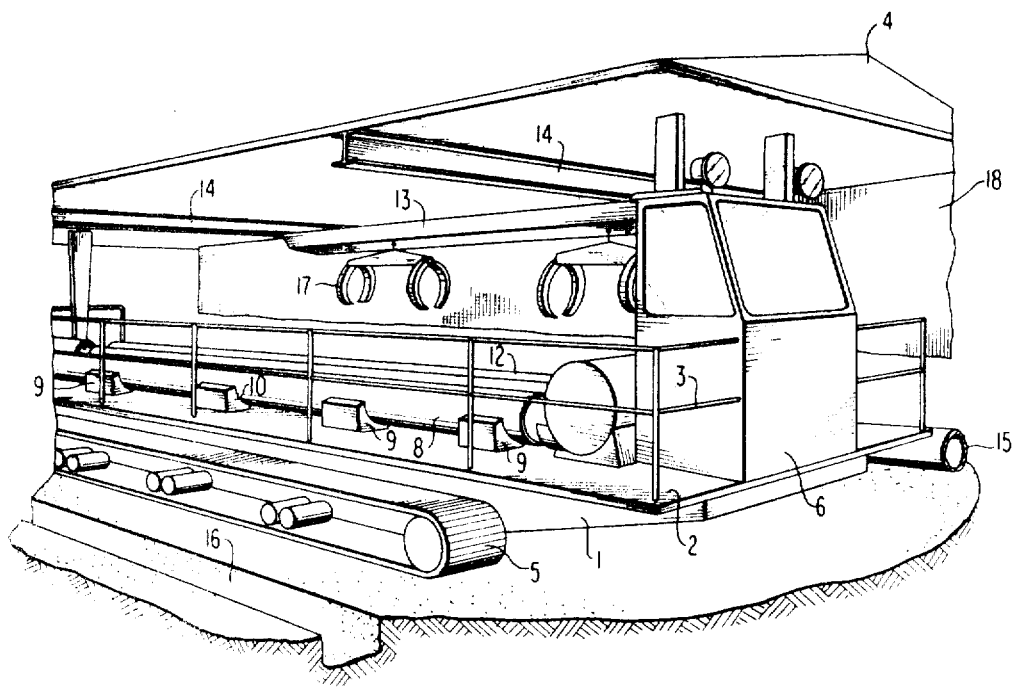
FIG. 1 is a perspective view of the front part of the movable welding installation in accordance with a first embodiment of the invention.
Figure 2:
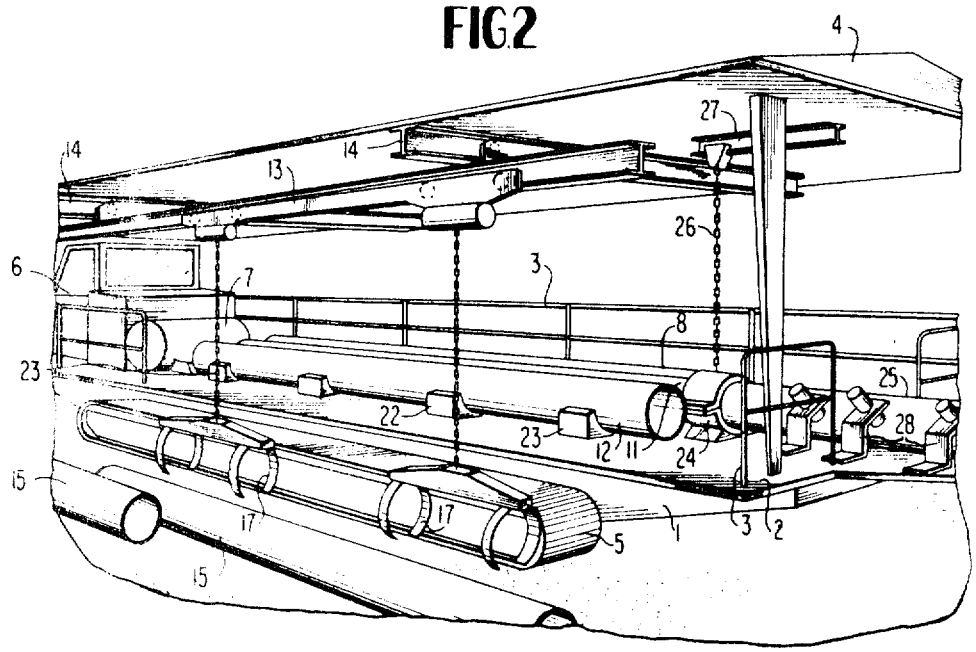
FIG. 2 is a perspective view of the rear part of the said installation.

In a first embodiment, as shown in FIGS. 1 to 3, the welding installation according to the invention comprises a self-propelled, cross-country vehicle 1 and comprises a platform 2, advantageously surrounded by a guard rail 3 and covered by a roof 4. The vehicle is driven by caterpillar tracks 5 or any other suitable means for the driving thereof, operated by a motor enclosed in a housing 6.

Situated behind the housing 6 is another housing 7 containing a driving member for the mandrels, ensuring the accurate positioning of the tubular element 8 to be welded to the end of the conduit already connected to the preceding conduit, with said element 8 resting on supporting cradles 9.

In this position, the element 8 is disposed in a station called the preparatory station 10.

FIGS. 2 and 3 show that conduit elements 11 and 12 are disposed in parallel relation alongside the element 8 on the central welding station and on a second preparatory station, respectively. The Figures also show a bridge 13 provided with lifting gears carrying gripper jaws 17 and rolling on transverse girders 14, this assembly ensuring the loading and the manipulation on the vehicle 1 of the tubular conduit elements 15 arranged beforehand on the ground along the root of the vehicle. FIG. 1 also shows the trench 16 in which the conduit is adapted to be buried after it has been formed.

In addition, waterproof covers such as 18, advantageously fixed to the roof 4, ensure protection of the installation and personnel against unfavorable weather conditions.

FIG. 2 shows the rear part of the movable welding arrangement in accordance with the said constructional form, and this Figure better shows certain details and members which are not shown in FIG. 1.

In particular, it is seen in this Figure that there are conduit elements 11 and 12 respectively positioned at the welding station 21 and at the second preparatory station 22 indicated by the supports 23.

Also shown at 24 are the two shells which can possibly enclose the zone to be welded, either as an addition to the mechanical action of the internal mandrel or as a replacement thereof, so as to ensure, during the welding operation, a perfect positioning of the tubular element 11 relatively to the conduit 25 already formed, which is itself held fast by suitable fixing means 28.

FIG. 3 shows more clearly details and members which are described by reference to the previous Figures. There can more especially be seen the welding station 21 formed by the cradles 31 and the two preparatory stations 10 and 22 formed by the cradles 9 and 23, respectively. The upper shell 32 suspended from the lifting gear 26 can also be seen in the Figure.

Figure 4A:
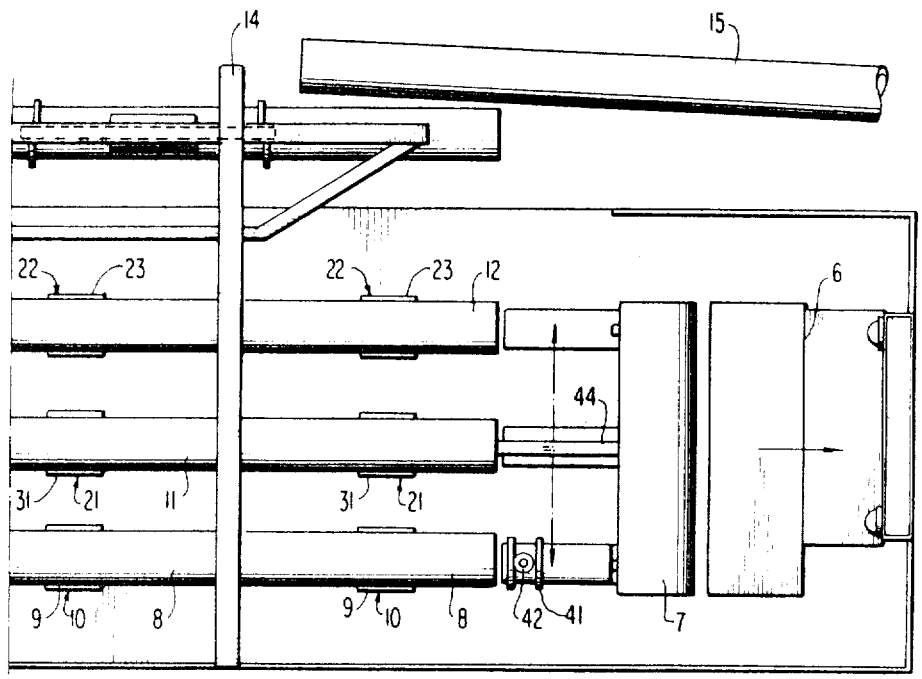
FIG. 4a is a plan view of the front part of the movable installation.
Figure 4B:
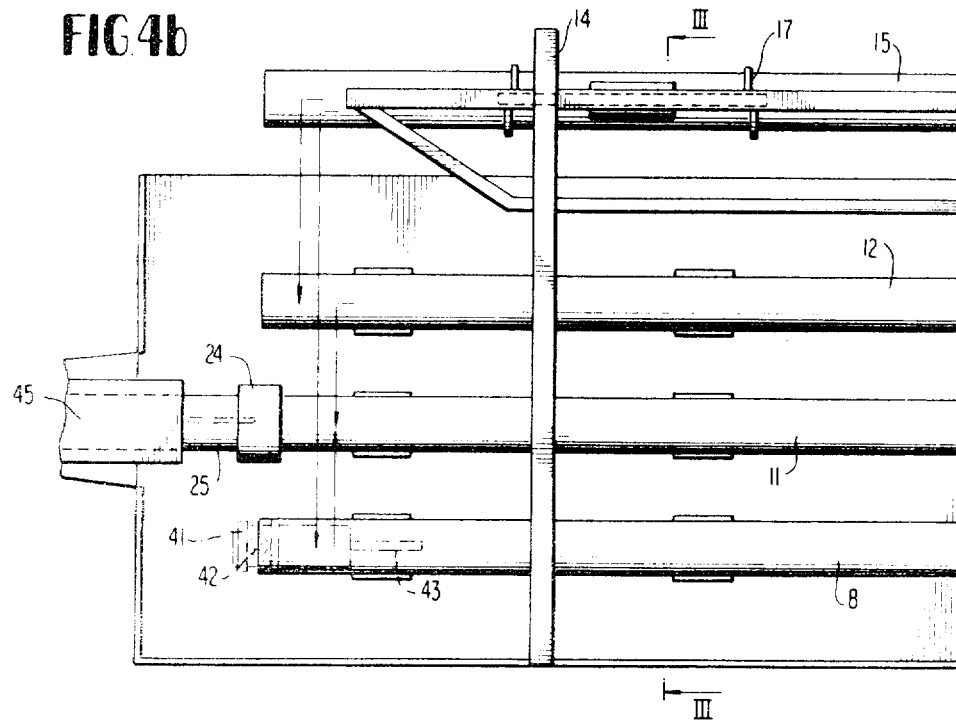
FIG. 4b is a plan view of the rear part of the installation.

FIGS. 4a and 4b make it possible for the operation of the aforementioned movable installation to be understood.

In FIG. 4a, it is possible to see the housing 7 in which are disposed the automatic means for driving and displacing the mandrels and welding devices. Particularly, one of the mandrels 47 is connected to the welding device 42, the assembly being adapted to be moved with a sliding movement inside the tubular element 8 by a shaft 43 controlled by the automatic driving member.

The shaft 43 can be formed by a flexible shaft which is coiled inside the housing 7 or by a rigid shaft introduced into the conduit 8 and receiving, at its rear end, the mandrel 41 provided with its welding device and suitable mechanical means by which the tubes to be welded are held in relation to one another during the welding operation, while its front end can be connected to an element of the aforementioned automatic control device.

A second identical welding head mandrel is disposed at the end of a shaft 44 and is in the welding position, that is to say, at the end of the element 11 at the welding position 24 (FIG. 4b).

A guide element 45 advantageously ensures the support of the conduit portion 25 previously constructed.

This arrangement in accordance with a first embodiment of the invention operates as follows:

Assuming the various tubular elements and members to be occupying the positions shown in FIGS. 4a and 4b, there is simultaneously carried out:

1. The welding of the element 11 to the end of the conduit 25 by means of the welding device fast with the mandrel fixed to the end of the shaft 44 and operating at the welding position;

2. The positioning at the end of the tube 8 of the mandrel 41 and the welding device 42, by introduction or sliding movement of the shaft 43 controlled by the automatic control member contained in the housing 7;

3. The preparation of the tube 12, particularly dressing and cleaning of the ends.

It has to be noted that the welding can be effected either on the internal face, by means of the welding device incorporated in the mandrel, or on the external face, by means of a welding device incorporated within the shells 24, or simultaneously with the two internal and external devices.

After welding, there is then carried out the retraction of the welding device and of the mandrel connected to the shaft 44 and the casing 24 is lifted by means of a secondary lifting gear 26 (FIG. 3), while the vehicle is advanced a distance substantially equal to the length of the tubular elements. At this moment, there is carried out the positioning of the tube 8 equipped with the welding head 42 and the mandrel 41 facing the unwelded end of the tube 11 by means of the lifting gear 13 (FIG. 3). Finally, the welding head and the mandrel connected to the shaft 44 are displaced and disposed in abutment with the previously prepared tube 12, while a fresh tubular element 15 is gripped by means of the lifting gear 13 (FIG. 3) and is deposited at the preparatory station 10 previously occupied by the element 8.

It is then possible to carry out simultaneously the welding of the said element 8 to the end of the element 11 and the preparation of the fresh element 15, and so on.

In a second embodiment, the movable welding installation comprises two self-propelled vehicles, a front vehicle and a rear vehicle, as shown in FIGS. 5 and 6.

The front vehicle, shown in FIG. 5, is formed by a self-propelled, cross-country vehicle represented as a whole by the reference 51, comprising essentially a platform 52 advantageously enclosed by a guard rail 53 and having a roof 54, the drive being effected by means of caterpillar tracks 55 or any other suitable propelling means. Arranged on the platform 52, seen successively from the front to the rear of the vehicle, are the motor 56, the control compartment 67 and the lifting gear 57 ensuring the handling of the tubular elements 58, the casing 59 containing first, the mandrel-driving member which ensures the exact positioning of the tubular elements to be welded to the end of the conduit and, secondly, the member for displacing the welding devices from one station to the other. A secondary lifting gear 60 displaces the tubular elements from one of the preparatory stations to the welding station.

Tubular conduit elements 61 and 62 rest near one of their ends respectively on the welding stations 63 and on one of the preparatory stations 64 of the vehicle 51, such stations being formed by movable supports (not shown) or by any other suitable means. In addition, the part 65 of the platform 52 defines the part of the second preparatory station associated with this vehicle.

Furthermore, covers (not shown) can be fixed to the roof 54 for protecting the personnel and the various members from bad weather influences.

The rear vehicle, shown in FIG. 6, is formed by a self-propelled cross-country vehicle with dimensions and a power substantially identical with those of the previously described front vehicle. The vehicle, represented as a whole by the reference 71, comprises essentially a platform 72 surrounded by a guard rail 73 and a roof 74, the drive being effected by means of caterpillar tracks 75 or any other suitable means.

Seen in succession from the front to the rear of the vehicle, the platform 72 carries the welding station 63 and the two preparatory stations 64 and 65 for the tubular elements, the welding position 76, the motor 77 and the control compartment 78. The tubular elements 61 and 62, previously mentioned in reference to FIG. 5, are also to be seen, these being disposed respectively by means of their ends on the welding station 63 and on one of the preparatory stations 64 of the vehicle 71, the said stations being formed by sliding supports such as 79.

FIG. 6 shows the tube 61 undergoing welding on the end of the conduit 80 which has already been formed, the said conduit being held substantially horizontally by means of a roller-type guide arrangement 81 suspended from a hoisting gear 82 connected to the back of the vehicle 71.

Furthermore, this vehicle, like the front vehicle, is advantageously fitted with covers (not shown), which can be fixed to the roof 74, for the purpose of protecting the personnel and various members against bad weather influences.

Finally, in the case where the route for the positioning of the conduit has a certain number of appreciable reliefs, the two vehicles are advantageously equipped with jacks permitting the tubular element 61 to be lifted by its ends and in this way ensuring the compensation for the slope, when the front vehicle reaches the top or bottom of such irregularities in the ground.

The sequence of the operations leading to the welding of a tubular element on the portion of a previously obtained conduit will be apparent from the description given by reference to FIGS. 7 to 10.

Figure 7:
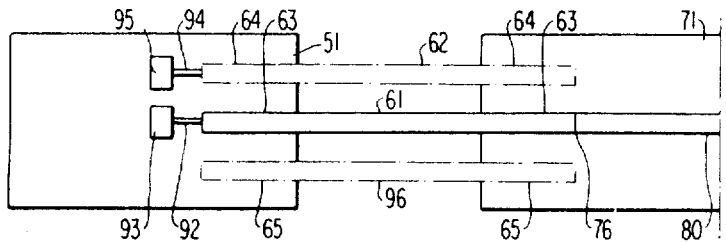
FIG. 7 shows the first phase of the welding operation when employing the movable installation construction in accordance with the second embodiment.

Referring to FIG. 7, there are carried out simultaneously at 76 the welding of the tubular element 61 on the previously constructed conduit 80 by means of the mandrel-welding head assembly 91 (FIG. 8) fixed on the end of the shaft 92 controlled by the driving member 93, the partial positioning in the tube 62 of the welding head and mandrel (not shown) fixed on the end of the shaft 94 controlled by the driving member 95 and the preparation of the ends of the tubular element 96.

Figure 8:
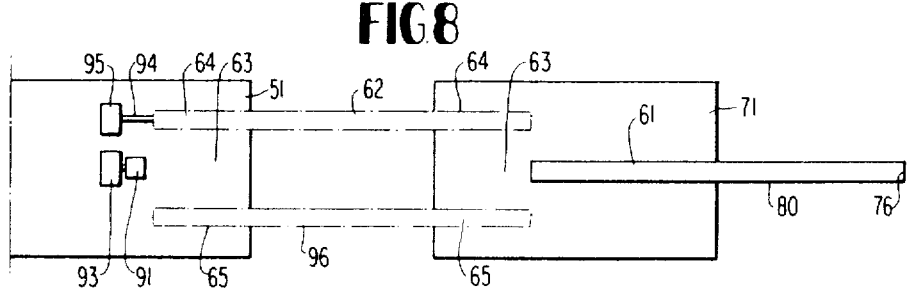
FIGS. 8 to 10 are schematic views of the three welding phases.

FIG. 8 shows the succession of the operations, which consist in causing the two vehicles to advance for a distance very substantially equal to the length of the tubular elements, while the welding-head mandrel assembly 91 is retracted by means of the driving member 93.

Figure 9:
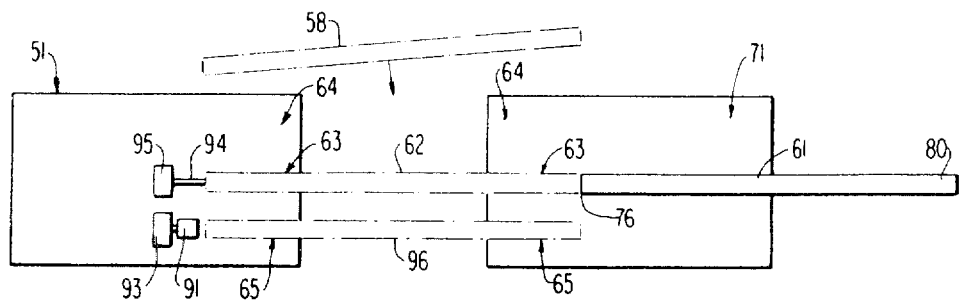

As shown in FIG. 9, there are then carried out simultaneously the displacement of the mandrel-welding head assembly 91 from the welding station 63 to the preparatory station 65, the positioning at the welding station 63 of the tube 62 and the mandrel-welding head assembly connected to the shaft 94 and also the final positioning of the said assembly in the said tube with a view to producing the weld bead at 76, and the loading of a new tubular element 58 at the preparatory station 64.

Figure 10:
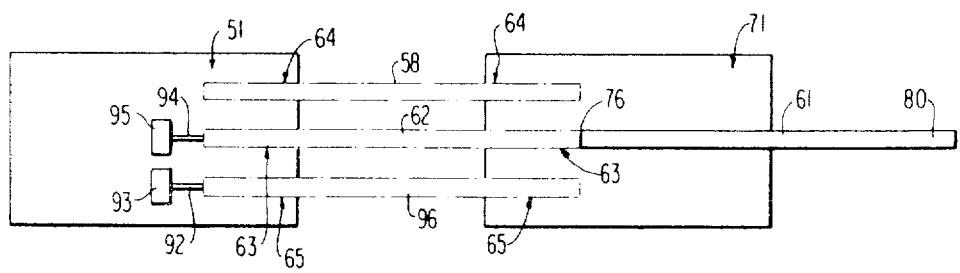

Finally, according to FIG. 10, there is carried out the welding of the tube 62 to the end of the previously welded tube 61 by means of the mandrel-welding head assembly connected to the shaft 94, while the mandrel-welding head assembly 91 is partially positioned in the tube 96 and the preparation of the ends of the tube 58 is effected, and so on.

What is claimed is:

1. In a mobile assembly for the installation of conduits by welding successive tubular elements, including: at least one self-propelled vehicle having a platform carrying cradles aligned along at least two parallel working axes and designed to receive tubular elements which have to be successively welded end to end, lifting gears for each element for positioning the same, means for placing said element firstly on the cradles of one of the axes in order to undergo thereon the preparatory work for welding, while another already prepared element is being welded to the end of the conduit already established and aligned on the second axis, and means for bringing the prepared new element, after the completion of the welding of the preceding element, and advance of the vehicle for the length of an element, on to the said second axis, in order, in its turn, to be welded to the end of the preceding element, the improvement wherein the platform of the vehicle has installed thereon automatic driving means aligned with the axes of the conduit elements, shafts connected thereto and capable of being introduced into the said elements to be welded, each shaft carrying, at its free end, a mandrel adapted to be fitted simultaneously into the element to be welded and into the end of the conduit already formed, means for exerting the necessary mechanical forces thereon to ensure the precise coincidence of the two ends of the tubes during the welding thereof, and welding means carried by the said mandrel, to effect welding inside the tubes.

2. The assembly according to claim 1, further comprising: that, at the welding station, two shells for encasing the ends of two tubular elements which are to be connected, the lower shell of the casing being fixed on the platform of the vehicle, while the upper shell is removable and maneuverable by means of a lifting gear, means permitting said two shells to exert mechanical pressure distributed all around the ends of the tubes to be welded, and wherein said welding means further include another welding arrangement integrated with the shells to operate alone or in association with welding equipment carried by the internal mandrel.

3. The assembly according to claim 1, having two working axes, one axis for the preparation of the tubular element to be welded and a welding axis.

4. The assembly according to claim 2, having two working axes, one axis for the preparation of the tubular element to be welded and a welding axis.

5. The assembly according to claim 1, having three working axes: a central welding axis and two preparatory axes situated on either side of the said welding axis.

6. The assembly according to claim 1, wherein: the self-propelled unit is formed by two independent vehicles, namely, a front vehicle and a rear vehicle, with the driving members of the shafts being positioned on the front vehicle and the welding station and the preparatory stations being placed on the rear vehicle.

7. The assembly according to claim 2, having three working axes: a central welding axis and two preparatory axes situated on either side of the said welding axis.

* * * * *